(12) United States Patent
Schober

(10) Patent No.: US 7,058,053 B1
(45) Date of Patent: Jun. 6, 2006

(54) METHOD AND SYSTEM TO PROCESS A MULTICAST REQUEST PERTAINING TO A PACKET RECEIVED AT AN INTERCONNECT DEVICE

(75) Inventor: Richard L. Schober, Cupertino, CA (US)

(73) Assignee: Avago Technologies General IP PTE. Ltd., Singapore (SG)

( * ) Notice: Subject to any disclaimer, the term of this patent is extended or adjusted under 35 U.S.C. 154(b) by 979 days.

(21) Appl. No.: 09/977,670

(22) Filed: Oct. 12, 2001

(51) Int. Cl.
*H04L 12/28* (2006.01)

(52) U.S. Cl. ..................... 370/390; 370/432

(58) Field of Classification Search ............... 370/390, 370/432, 461, 462, 447
See application file for complete search history.

(56) References Cited

U.S. PATENT DOCUMENTS

| | | | |
|---|---|---|---|
| 6,212,182 B1 * | 4/2001 | McKeown | 370/390 |
| 6,477,169 B1 * | 11/2002 | Angle et al. | 370/395.42 |
| 6,661,788 B1 * | 12/2003 | Angle et al. | 370/390 |
| 6,760,331 B1 * | 7/2004 | Moussavi et al. | 370/390 |
| 6,839,794 B1 * | 1/2005 | Schober | 710/316 |
| 6,920,106 B1 * | 7/2005 | Chou et al. | 370/229 |
| 2002/0143951 A1 * | 10/2002 | Khan et al. | 709/227 |
| 2003/0043803 A1 * | 3/2003 | Hooper | 370/390 |

OTHER PUBLICATIONS

"InfiniBand Switch Chip Runs at 10 Gbps On Eight Ports", Nicholas Cravotta, Nov. 8, 2001, EDN, 1 page.

"Assemble Fast Switch Fabrics With 32-Port InfiniBand Node p. 60", Electronic Design, Oct. 15, 2001, 4 pages.

"RedSwitch, Inc. Announces Industry's Highest Performance and Highest Integration InfiniBand Switch Chip", RedSwitch Press Release, Oct. 16, 2001, 2 pages.

"RedSwitch Gearing Up To Launch New Chip", Steve Tanner, Silicon Valley Business Ink, Oct. 26, 2001, 3 pages.

"Mellanox Integrates Serdes Into Infiniband Switch", Jerry Ascierto, EE.Times, Oct. 23, 2001, 3 pages.

"Switch Chip Expands InfiniBand Integration", EEM File 3130, Tony Chance, 2 pages.

"RedSwitch Announces 16 Gbyte/s Throughout Switch Product for RapidIO Architecture", RedSwitch Press Release, Milpitas, Calif., May 15, 2001, Tony Chance, 2 pages.

"RedSwitch and Agilent Technologies Unveil 160-GB/s Throughout Switch Product for InfiniBand Architecture", RedSwitch Press Release, Intel Developer Forum Conference, San Jose, Calif., Feb. 27, 2001, Mark Alden-Agilent, Tony Chance-RedSwitch, 2 pages.

* cited by examiner

*Primary Examiner*—Frank Duong

(57) ABSTRACT

A method to process a multicast transfer request within an interconnect device includes receiving the multicast transfer request pertaining to a packet stored by the interconnect device. A number of unicast transfer requests are spawned based on the multicast transfer request. Responsive to a generation of a transfer grant for at least one of the number of unicast transfer requests, a determination is made whether transfer grants have been generated for all of the number of unicast transfer requests. If so, then the packet stored by the interconnect device, and to which the multicast transfer request pertains, is discarded.

31 Claims, 13 Drawing Sheets

Fig. 7

GRANT 180

| 186 | 184 | 136 | 146 | 134 | 132 | 142 | 182 |
|---|---|---|---|---|---|---|---|
| ERROR CODE | TOTAL BLOCKS SENT | TOTAL GRANT COUNT | TRANS-FER RATE | VIRTUAL LANE | OUTPUT PORT | PACKET LENGTH | REQUEST IDENTIFIER | INPUT PORT | GRANT CODE |
| 63 56 | 55 44 | 43 39 | 38 37 | 36 32 | 31 28 | 27 17 | 16 07 | 06 02 | 01 00 |

TRANSFER RATE

| VALUE | MEANING |
|---|---|
| 0 0 | 1 CYCLE PER WORD |
| 0 1 | 4 CYCLES PER WORD |
| 1 0 | 3 CYCLES PER WORD (RESERVED) |
| 1 1 | 12 CYCLES PER WORD (RESERVED) |

GRANT CODE

| VALUE | MEANING |
|---|---|
| 0 0 | NULL |
| 0 1 | VALID |
| 1 0 | ERROR |
| 1 1 | RESERVED |

ERROR CODE

| VALUE | MEANING |
|---|---|
| 0 0 0 0 0 0 0 0 | NO ERROR |
| 0 X 0 0 0 0 0 1 | UNICAST DLID OUT-OF-RANGE |
| 0 X 0 0 0 0 1 0 | UNICAST FORWARDING TABLE ENTRY NOT VALID OR DEFAULT MULTICAST PORT REGISTERS NOT VALID |
| 0 X 0 0 0 0 1 1 | OUTPUT PORT NOT VALID FOR MGMT PORT DIRECTED-ROUTE PACKET |
| 0 X 1 X X X X 1 | (OUTPUT PORT = INPUT PORT) & (PORT ≠ 0) |
| 0 X 1 X X 1 X X | SL-TO-VL MAP TABLE ENTRY NOT VALID |
| 0 X 1 X X 1 X X | PACKET LARGER THAN NEIGHBOR MTU |
| 0 X 1 1 0 X X X | RAW PACKET NOT VALID FOR OUTPUT PORT |
| 0 X 1 1 1 X X X | P-KEY NOT VALID FOR OUTPUT PORT |
| 0 1 X X X X X X | P-KEY NOT VALID FOR INPUT PORT |
| 1 1 1 1 1 1 0 1 | OUTPUT PORT OFFLINE |
| 1 1 1 1 1 1 1 0 | HEAD-OF-QUEUE LIFETIME TIMEOUT |
| 1 1 1 1 1 1 1 1 | SWITCH LIFETIME TIMEOUT |

METHOD AND SYSTEM TO PROCESS A MULTICAST REQUEST PERTAINING TO A PACKET RECEIVED AT AN INTERCONNECT DEVICE

FIELD OF THE INVENTION

The present invention relates generally to the field of data communications and, more specifically, to the processing of a multicast request pertaining to a packet received and stored at an interconnect device.

BACKGROUND OF THE INVENTION

Existing networking and interconnect technologies have failed to keep pace with the development of computer systems, resulting in increased burdens being imposed upon data servers, application processing and enterprise computing. This problem has been exasperated by the popular success of the Internet. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification (the IBA specification) Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switch fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Requests may include both unicast and multicast transmission requests pertaining to packet received on any one of the multiple input ports of the switching device. Arbitration schemes typically include either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come-first-serve policy, a shortest message first policy or a priority based policy, to name but a few.

The physical properties of the IBA interconnect technology have been designed to support both module-to-module (board) interconnects (e.g., computer systems that support I/O module add in slots) and chassis-to-chassis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand Architecture Specification, showing the interconnection of processor nodes and I/O nodes utilizing the IBA switched fabric.

SUMMARY OF THE INVENTION

According to one aspect of the present invention, there is provided a method to process a multicast transfer request within an interconnect device. The multicast transfer request pertaining to a packet stored by the interconnect device is received. A number of unicast transfer requests are spawned based on the multicast transfer request. Responsive to a generation of a transfer grant for at least one of the number of unicast transfer requests, a determination is made as to whether transfer grants have been generated for all of the number of unicast transfer requests. If transfer grants have been generated for all of the number of unicast transfer requests, then the packet to which the multicast transfer request pertains is discarded. If transfer grants have not been generated for all of the number of unicast transfer requests, then the packet to which the multicast transfer request pertains is retained.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 7 illustrates an exemplary grant that may be issued responsive to any one of the requests discussed in the present application.

DETAILED DESCRIPTION

A method and system to process a multicast request associated with a packet received and stored at an interconnect device are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any interconnect device within any interconnect architecture.

Figure 1:
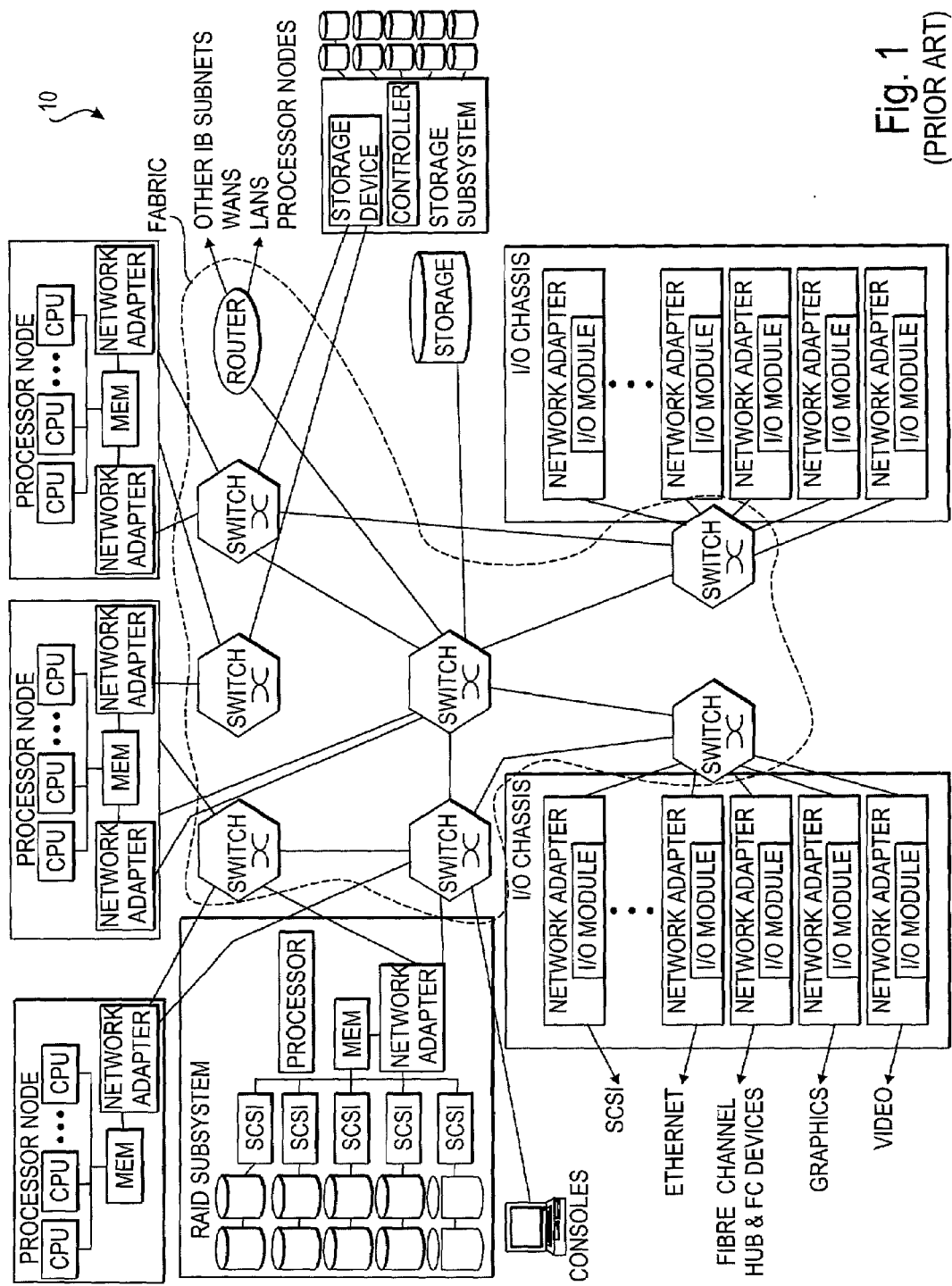
FIG. 1 is a diagrammatic representation of a System Area Network, according to the prior art, as supported by a switch fabric.
Figure 2A:
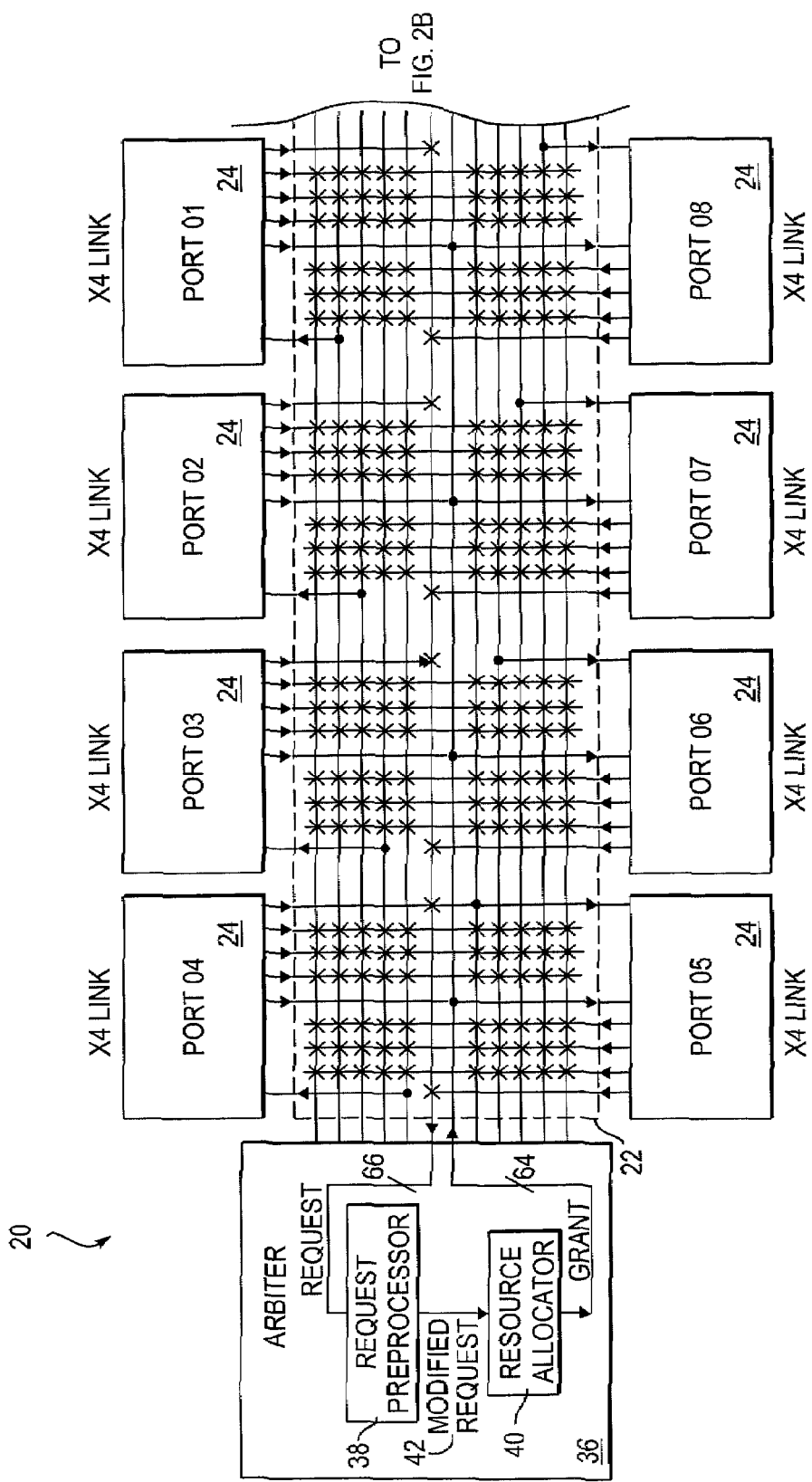
FIGS. 2A and 2B provide a diagrammatic representation of a datapath, according to an exemplary embodiment of the present invention, implemented within an interconnect device (e.g., a switch).
Figure 2B:
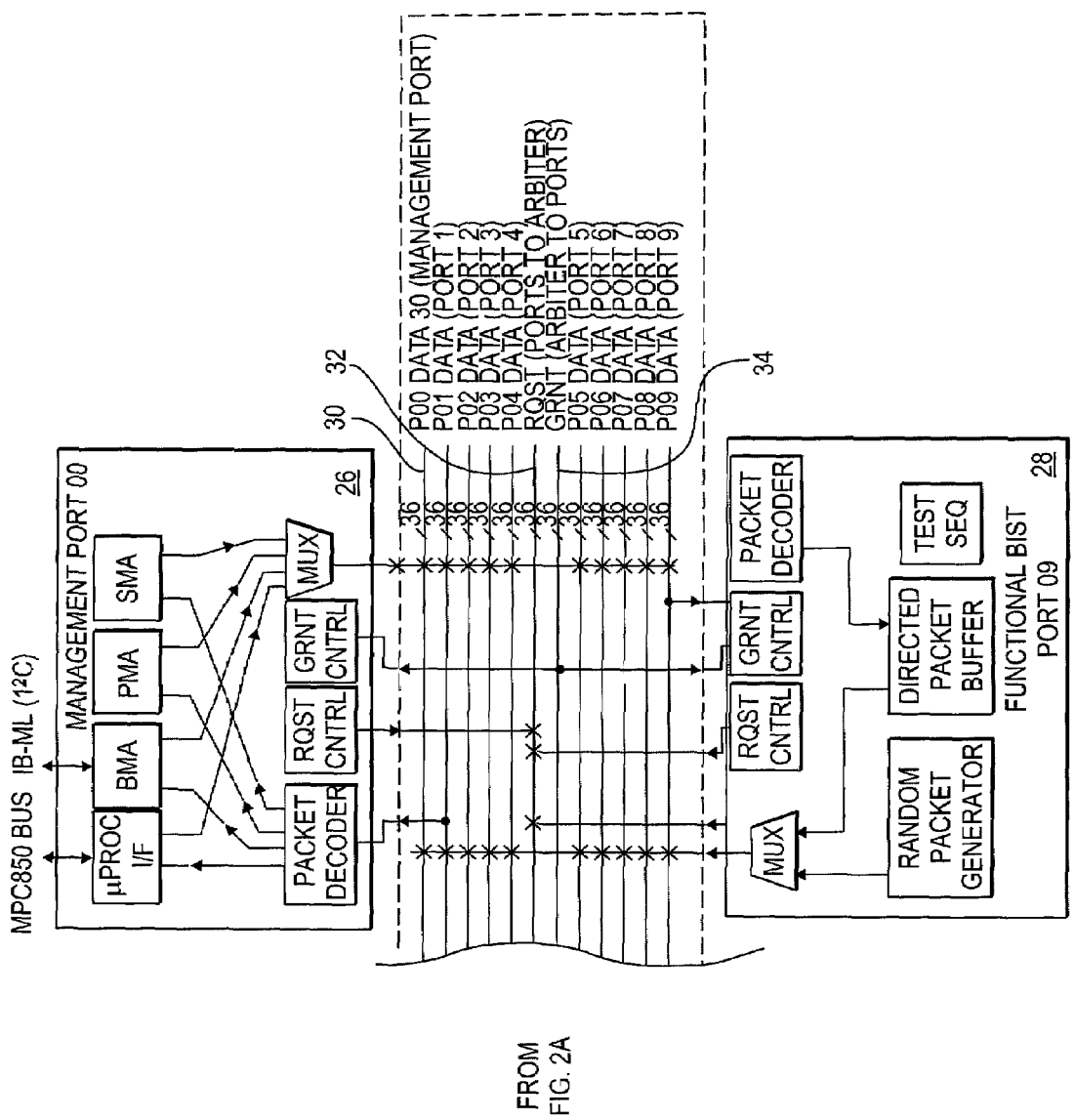

FIGS. 2A and 2B provide a diagrammatic representation of a datapath 20, according to an exemplary embodiment of the present invention, implemented within an interconnect device (e.g., a switch). The datapath 20 is shown to include a crossbar 22 that includes ten 36-bit data buses 30, a 66-bit request bus 32 and a 64-bit grant bus 34. Coupled to the crossbar 22 are eight communications ports 24 that issue resource requests to an arbiter 36 via the request bus 32, and that receive resource grants from the arbiter 36 via the grant bus 34. The resource requests and grants pertain to the transmission of packets between ports 24 via the crossbar 22.

The arbiter 36 includes a request preprocessor 38 to receive resource requests from the request bus 32 and to generate a modified resource request 42 to a resource allocator 40. The resource allocator 40 then issues a resource grant on the grant bus 34. Further details regarding the arbiter 36 will be discussed in detail below.

In addition to the eight communications ports 24, a management port 26 and a functional Built-In-Self-Test (BIST) port 28 are also coupled to the crossbar 22. The management port 26 includes a Sub-Network Management Agent (SMA) that is responsible for network configuration, a Performance Management Agent (PMA) that maintains error and performance counters, a Baseboard Management Agent (BMA) that monitors environmental controls and status, and a microprocessor interface.

The functional BIST port 28 supports stand-alone, at-speed testing of an interconnect device including the datapath 20. The functional BIST port 28 includes a random packet generator, a directed packet buffer and a return packet checker.

Figure 3:
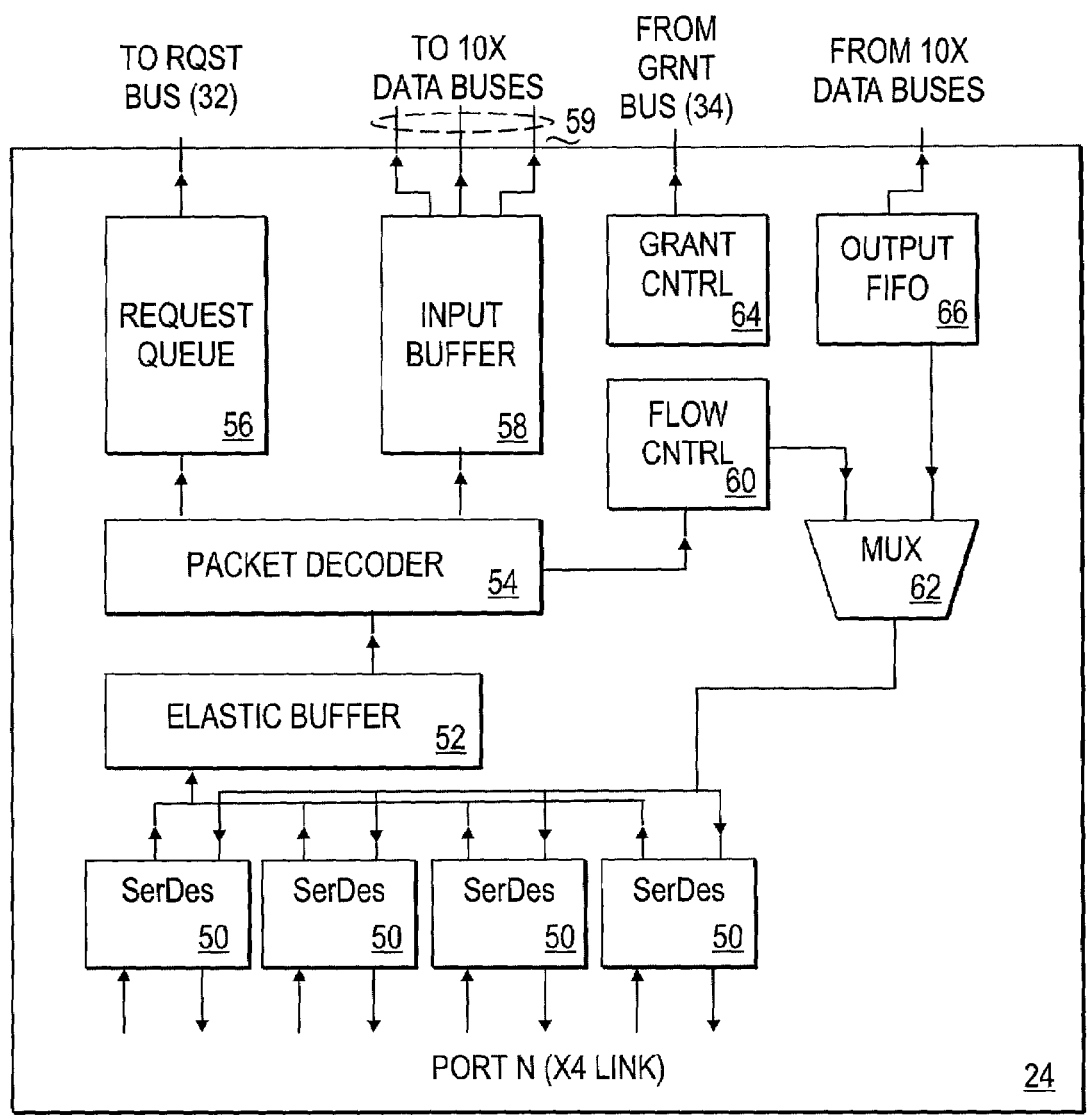
FIG. 3 is a diagrammatic representation of communications port, according to an exemplary embodiment of the present invention, which may be employed within a datapath.

Turning now to the communication ports 24, FIG. 3 is a block diagram providing further architectural details of an exemplary communications port 24 as may be implemented within the datapath 20. While the datapath 20 of FIGS. 2A and 2B are shown to include eight ×4 duplex communication ports 24, the present invention is not limited to such a configuration. Referring specifically to FIG. 3, each communications port 24 is shown to include four Serializer-Deserializer circuits (SerDes's) 50 via which 32-bit words are received at and transmitted from a port 24. Each SerDes 50 operates to convert a serial, coded (8B10B) data bit stream into parallel byte streams, which include data and control symbols. Data received via the SerDes's 50 at the port 24 is communicated as a 32-bit word to an elastic buffer 52. The elastic buffer 52 has two primary functions, namely:

(1) To accommodate frequency differences (within a specified tolerance) between clocks recovered from an incoming bit stream and a clock local to the datapath 20; and (2) To accommodate skew between symbols being received at the datapath 20 on four serial data channels.

Incoming data is further synchronized with a core clock as it is propagated through the elastic buffer 52.

Figure 4:
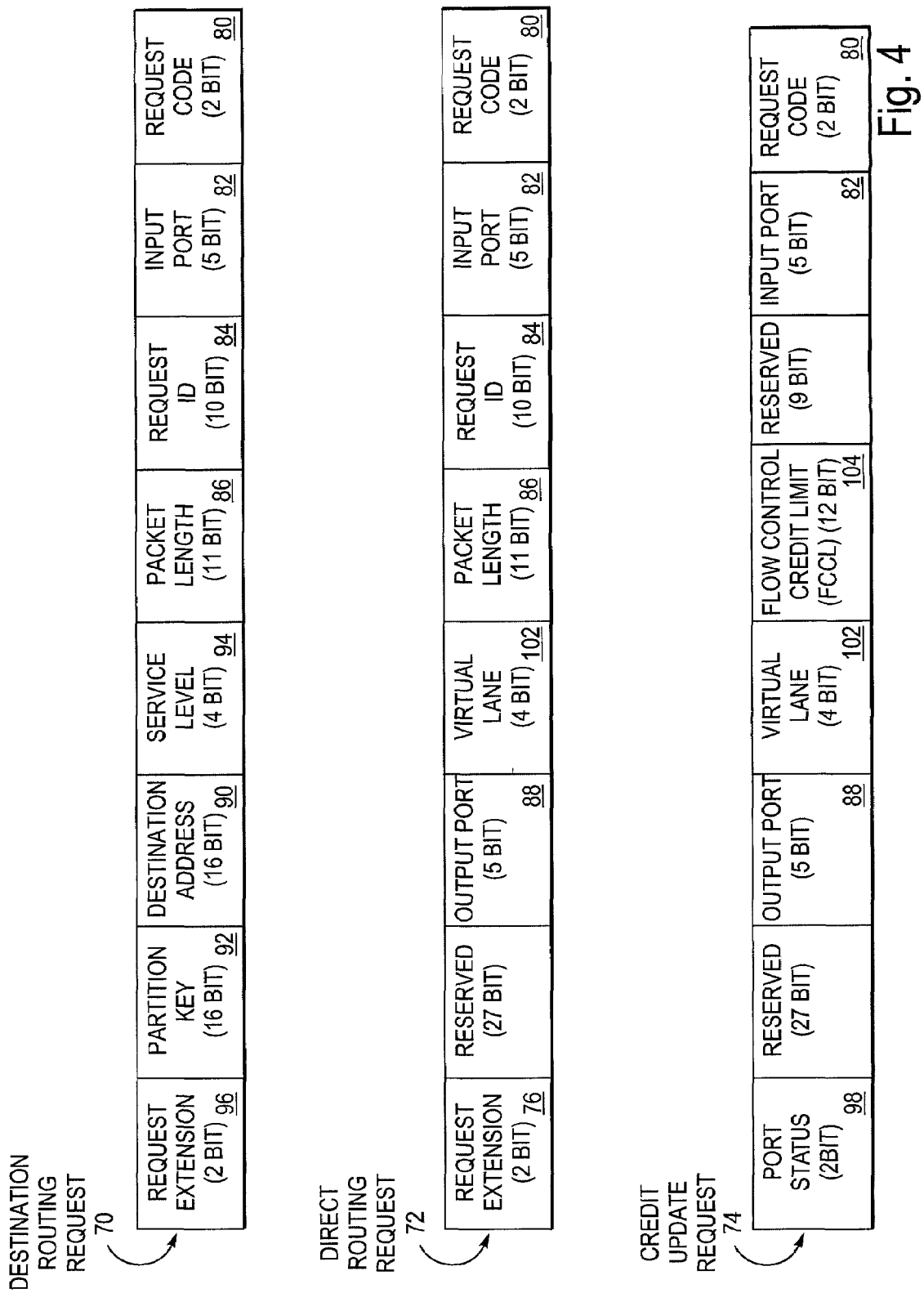
FIG. 4 illustrates exemplary packet transfer requests and an exemplary credit update request.

From the elastic buffer 52, packets are communicated to a packet decoder 54 that generates a request, associated with a packet, which is placed in a request queue 56 for communication to the arbiter 36 via the request bus 32. In the exemplary embodiment of the present invention, the types of requests generated by the packet decoder 54 for inclusion within the request queue 56 include packet transfer requests and credit update requests. FIG. 4 illustrates two examples of packet transfer requests, namely a destination routing request 70 and a direct routing request 72. An exemplary credit update request 74 is also shown.

Return to FIG. 3, each communications port 24 is also shown to include a 20 Kbytes input buffer 58, the capacity of which is divided equally among data virtual lanes (VLs) supported by the datapath 20. Virtual lanes are, in one embodiment, independent data streams that are supported by a common physical link. Further details regarding the concept of "virtual lanes" is provided in the InfiniBand™ Architecture Specification, Volume 1, Oct. 24, 2000.

The input buffer 58 of each port 24 is organized into 64-byte blocks, and a packet may occupy any arbitrary set of buffer blocks. A link list keeps track of packets and free blocks within the input buffer 58.

Each input buffer 58 is also shown to have three read port-crossbar inputs 59.

A flow controller 60 also receives input from the packet decoder 54 to generate flow control information (e.g., credits) that may be outputted from the port 24 via a multiplexer (MUX) 62 and the SerDes 50 to other ports 24. Further details regarding an exemplary credit-based flow control are provided in the InfiniBand™ Architecture Specification, Volume 1.

The communications port 24 also includes a grant controller 64 to receive transfer grants 180 from the arbiter 36 via the grant bus 34. FIG. 7 provides an example of a transfer grant 180.

An output FIFO 66 has sufficient capacity to hold a maximum-sized packet, according to a communications protocol supported by the datapath 20. The output FIFO 66 provides elasticity for the insertion of inter-frame symbols, and flow control messages, between packets. The output FIFO 66 furthermore provides speed matching for moving packets from ×4 to ×1 ports.

Returning to FIG. 4, within the routing requests 70 and 72, a request code 80 is a 2-bit value identifies the request type, an input port identifier 82 identifies a port 24 from which the request was issued, and a request identifier 84 is a "handle" or identifier for a request that allows the grant controller 64 of a communications port 24 to associate a grant 180 with a specific packet. For example, the request identifier 84 may be a pointer to a location within the input buffer 58 of a communications port 24. The request identifier 84 is necessary as a particular port 24 may have a number of outstanding requests that may be granted by the arbiter 36 in any order.

A packet length identifier 86 provides information to the arbiter 36 regarding the length of a packet associated with a request. An output port identifier 88 of the direct routing request 72 identifies a communications port 24 to which the relevant packet should be directed. In lieu of an output port identifier 88, the destination routing request 70 includes a destination address 90 and a partition key 92. A destination routing request 70 may also include a service level identifier 94, and a request extension identifier 96 that identifies special checking or handling that should be applied to the relevant destination routing request 70. For example, the request extension identifier 96 identifies that an associated packet is a subset management packet (VL15), a raw (e.g., non-Infiniband) packet, or a standard packet where the partition key is valid/invalid.

The exemplary credit update request 74 includes a port status identifier 98 that indicates whether an associated output port, identified by the output port identifier 88, is online and, if so, the link width (e.g., 12×, 4× or 1×). Each credit update request 74 also includes a virtual lane identifier 102, a flow control credit limit 104 and an input port identifier 82.

The virtual lane identifier 102 indicates for which virtual channel credit information is updated. The flow control credit limit 104 is a sum of a total number of blocks of data received (modulo 4096) at a remote receiver on the relevant virtual lane, plus the number of 64-byte blocks (credit units) the remote receiver is capable of receiving (or 2048 if the number exceeds 2048) on the given virtual lane.

To compute the number of available credits, the resource allocator 40 subtracts the total number of blocks sent on the relevant virtual lane from the flow control credit limit 104 (modulo 4096). This computation counts packets that have been sent after the remote receiver sent a flow control message, thus making the credit forwarding mechanism tolerant of link delays. The effective computation is:

Available Credits=Reported Credits−(local value of total blocks sent−remote value of total blocks received).

Arbiter

Figure 5:
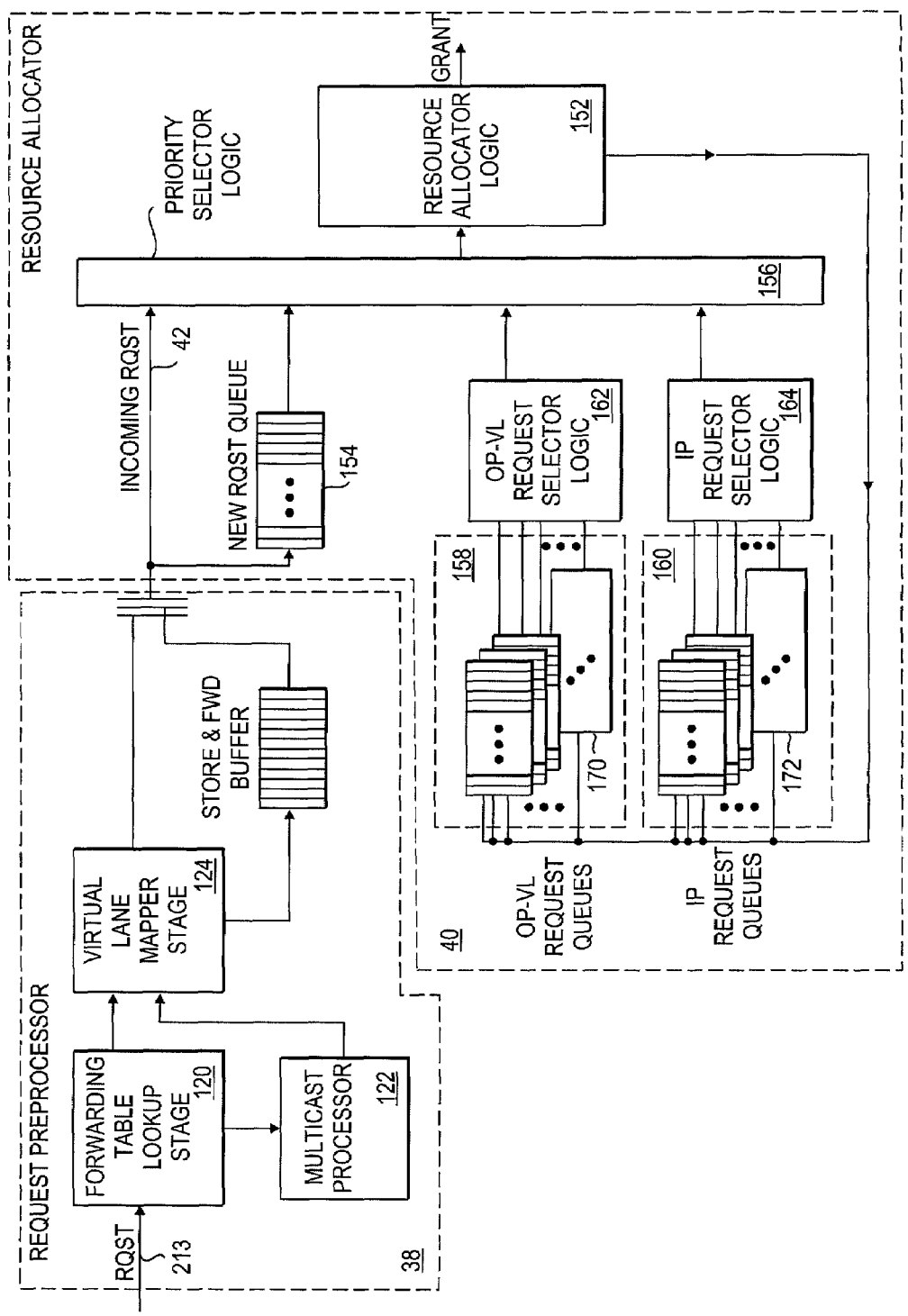
FIG. 5 is a block diagram illustrating the conceptual architecture of an arbiter, according to an exemplary embodiment of the present invention.

FIG. 5 is a conceptual block diagram of the arbiter 36, according to an exemplary embodiment of the present invention. The arbiter 36 is shown to include the request preprocessor 38 and the resource allocator 40. As discussed above, the arbiter 36 implements a central arbitration scheme within the datapath 20, in that all requests and resource information are brought to a single location (i.e., the arbiter 36). This offers certain advantages in that a central, consolidated view of resource availability and demand allows efficient resource allocation and potentially increased throughput. It should however be noted that the present invention may also be deployed within a distributed arbitration scheme, wherein decision making is performed at local resource points to deliver potentially lower latencies.

The arbiter 36, in the exemplary embodiment, implements serial arbitration in that one new request is accepted per cycle, and one grant is issued per cycle. The exemplary embodiment implements serialization as it is envisaged that an interconnect device including the datapath 20 will have an average packet arrival rate of less than one packet per clock cycle. Again, in deployments where the average packet arrival rate is greater than one packet per clock cycle, the teachings of the present invention may be employed within an arbiter that implements parallel arbitration.

Dealing first with the request preprocessor 38, a request (e.g., a destination routing, direct routing or credit update request 70, 72 or 74) is received on the request bus 32 at a forwarding table lookup stage 120 that includes both unicast and multicast forwarding tables. Specifically, a packet's destination address 90 (or DLID) is utilized to perform a lookup on both the unicast and multicast forwarding tables. If the destination address 90 is for a unicast address, the destination address 90 is translated to an output port number. On the other hand, if the destination address 90 is for a multicast group, a multicast processor 122 spawns multiple unicast requests based on a lookup in the multicast forwarding table.

From the forwarding table lookup stage 120, a request is forwarded to a virtual lane mapper stage 124 where a request's service level identifier 94, input port identifier 82 and output port identifier 132 (determined at stage 120) are utilized to perform a lookup in a virtual lane map (not shown) and to output a virtual lane identifier.

Figure 6:
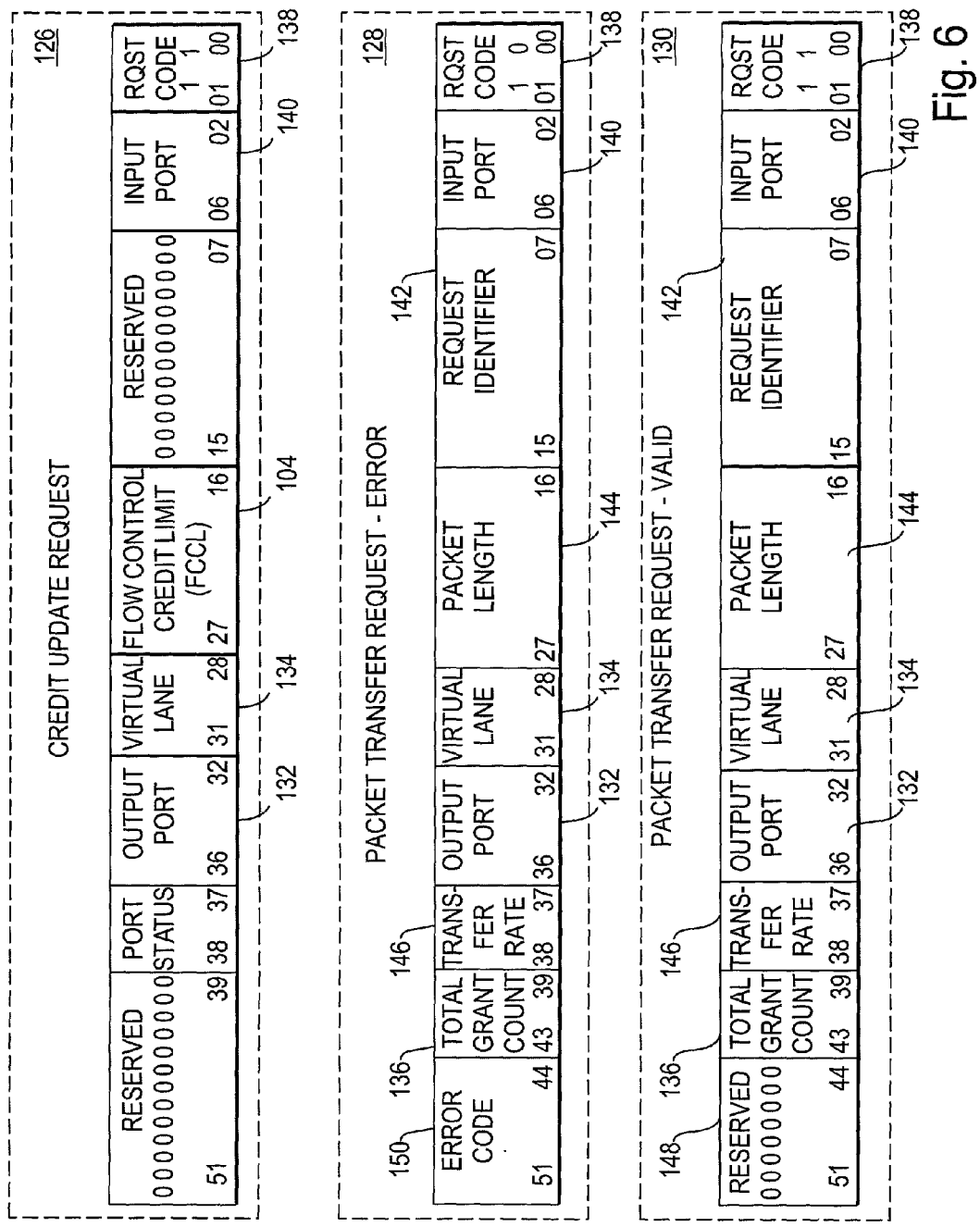
FIG. 6 provides representations of exemplary modified resource requests that may be outputted from a request preprocessor to a request allocator of the arbiter illustrated in FIG. 5.

Accordingly, the output of the request preprocessor 38 is a modified request 42 that is derived from a request, such as any of those shown in FIG. 4. FIG. 6 is a diagrammatic representation of exemplary modified resource requests 42 that may be outputted from the request preprocessor 38 to the resource allocator 40. Taking a valid packet transfer request 130 as an example, it will be noted that this transfer request 130 includes an output port identifier 132 generated at the forwarding table lookup stage 120 and a virtual lane identifier 134 generated at the virtual lane mapper stage 124.

A total grant count 136 is also included within the request 130. The total grant count 136 is generated at the forwarding table lookup stage 120, and is utilized to track multicast requests.

Other fields within the valid package transfer request 130 include a request code 138 that identifies a request type and an input port identifier 140 that identifies the port 24 from which the request originated, a request identifier 142 that uniquely identifies the request, a packet length value 144 that indicates the number of 4-byte words within a packet, a transfer rate value 146 that identifies the speed at which the packet will be sent through the crossbar 22 of the datapath 20 and a reserved field 148.

The error package transfer request 128 is similar to the request 130, but includes an error code 150 that identifies a unique error usually detected within the request preprocessor, but sometimes detected in the resource allocator 40.

The credit update request 126 is shown to include substantially the same information as the credit update request 74 illustrated in FIG. 4.

Returning to FIG. 5, a modified incoming request (e.g., a modified resource request 42 such as any of the requests 126, 128 or 130) is received at the resource allocator 40 from the request preprocessor 38. An incoming (or just-arrived) modified request 42 may proceed directly to resource allocator logic 152, if there is no contention with further pending requests stored in a new request queue 154 that are awaiting processing by the resource allocator logic 152. If such contention does exist, an incoming modified request 42 is placed at the back of the new request queue 154.

As stated above, FIG. 5 is a conceptual diagram of the arbiter 36, and the various queues and selectors described above may not be physically implemented as discrete components or logic blocks. For example, the request queues discussed below and above are, in one embodiment, each implemented as link lists within a single pending request buffer. Nonetheless, for a conceptual understanding of the present invention, it is useful to make reference to FIG. 5.

The resource allocator 40 is shown to include priority selector logic 156 that implements a priority scheme to feed resource requests from one of four sources to the resource allocator logic 152. The four sources from which the priority selector logic 156 selects a resource request are: (1) an incoming request 312; (2) the new request queue 154; (3) a group 158 of output port-virtual lane (OP-VL) request queues 170; and (4) a group 160 of input port (IP) request queues 172. The group 158 of output port-virtual lane (OP-VL) request queues 170 has output port-virtual lane (OP to-VL) request selector logic 162 associated therewith for performing a selection of requests from within the group 158 of queues for presentation to the priority selector logic 156. Similarly, the group 160 of input port (IP) request queues 172 has input port request selector logic 164 associated therewith to select a request for presentation to the priority selector logic 156.

The arbiter 36 employs a two-level allocation policy. The first level of the allocation policy combines flow control credits and port availability in an "all-or-nothing" allocation policy. Considering a request received at the resource allocator logic 152 from the priority selector logic 156, if (1) sufficient flow control credits for a virtual lane identified by the virtual lane identifier 134 of the request are available and (2) if an output port identified by the output port identifier 132 of the request is available, then both the virtual lane and output port identified within the relevant request are allocated to the request by the resource allocator logic 152.

On the other hand, if either insufficient flow control credits for a virtual lane, or the output port itself, are currently unavailable, then no resources (i.e., neither the virtual lane nor the output port) are allocated, and the request 42 is placed at the back of an output port-virtual lane (OP-VL) request queue 170 corresponding to the requested output port and virtual lane.

The second level of the allocation policy is for input buffer read port availability. As this is the second level of the allocation policy, a request must first acquire flow control credits for a virtual lane and a target output port before an input read buffer port is committed by the resource allocator logic 152. Accordingly, once a virtual lane and target output port have been allocated, if an input read buffer port is not available, the relevant request is put on the back of an input port (IP) request queue 172 corresponding to an input port identified within the relevant request by the input port identifier 140.

The output port-virtual lane request selector logic 162 monitors each of the request queues 170 within the group 158 of output port-virtual lane request queues 170. As flow control credits and output ports become available, the selector logic 162 chooses among pending requests in the group 158 of queues 170. In an exemplary embodiment of the present invention where the arbiter 36 supports the Infini-Band™ Architecture, the output port-virtual lane request selector logic 162 may implement the InfiniBand VL arbitration scheme.

Similarly, the input port request selector logic 164 monitors each of the input port request queues 172 within the group 160 as read port-crossbar inputs 59 become available. The selector logic 164 chooses among pending requests utilizing, for example, a simple round-robin selection policy.

Upon the availability of all resources required to satisfy a particular request, the resource allocator logic 152 will issue a transfer grant 180, on the grant bus 34. FIG. 7 illustrates the content of an exemplary transfer grant 180. The transfer grant 180 contains a number of fields in common with a request, as well as an additional grant code 182, a total blocks sent field 184, and an error code field 186.

Processing of Multicast Requests

As discussed above, when a request is received on the request bus 32 at the request preprocessor 38, during a forwarding table lookup stage 120 both unicast and multicast forwarding tables are accessed utilizing a destination address 90. If the destination address 90 is for a unicast address, the destination address 90 is translated to an output port number. On the other hand, if the destination address 90 is for a multicast group, the multicast processor 122 spawns multiple unicast requests based on a lookup in the multicast forwarding table 214.

A modified resource request 42 (e.g., the packet transfer request 130 illustrated in FIG. 6) includes a total grant count 136 that is generated during the forwarding table lookup stage 120, and is utilized to track multicast requests.

Figure 8:
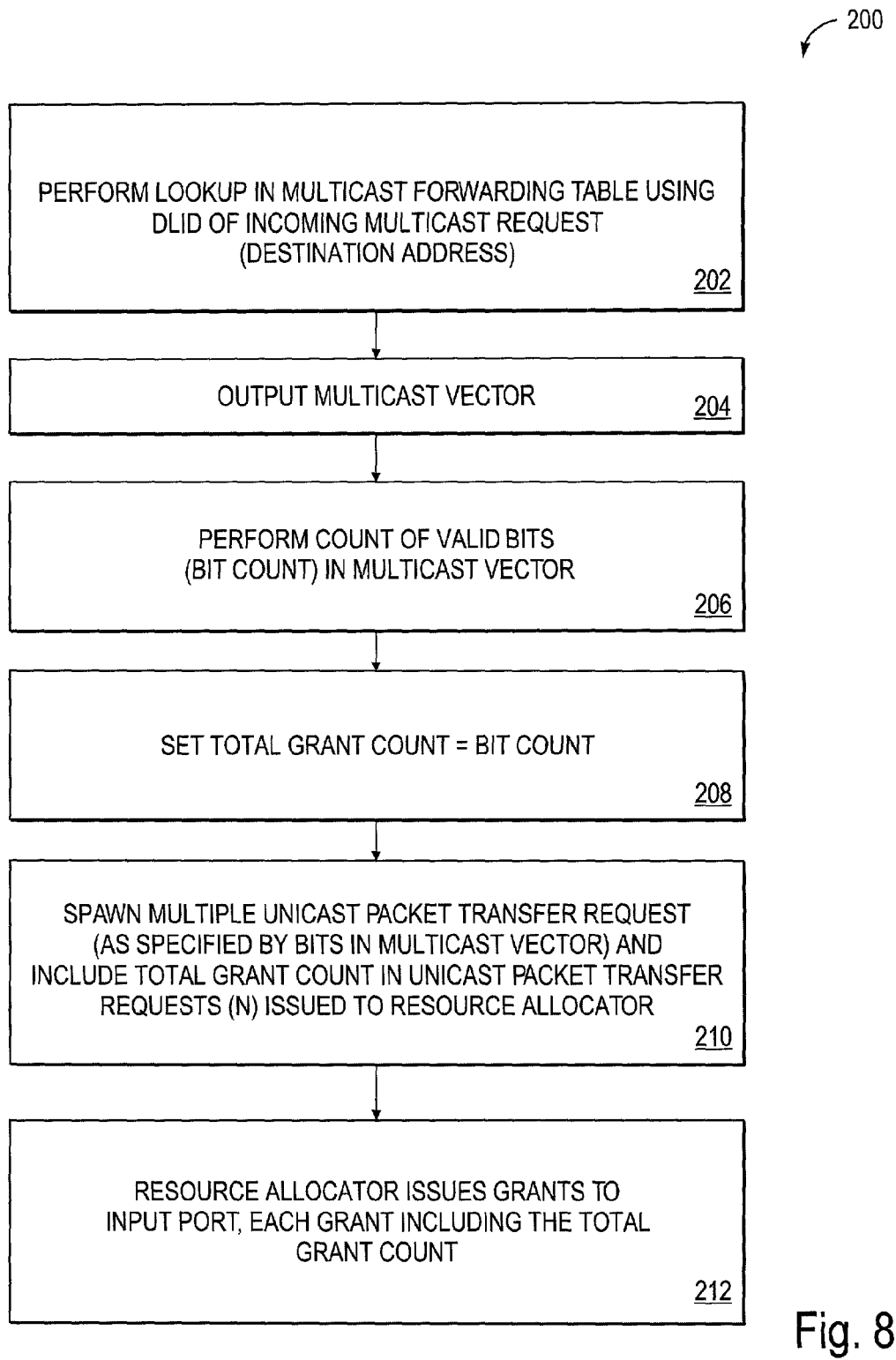
FIG. 8 is a flowchart illustrating a method, according to exemplary embodiment of the present invention, performed by the arbiter to process a multicast transfer request, and to issue a multiple transfer grants responsive to the multicast transfer request.

FIG. 8 is a flow chart illustrating a method 200, according to an exemplary embodiment of the present invention, performed by the arbiter 36 to process a multicast transfer request, and to issue multiple transfer grants responsive to the multicast transfer request.

The method 200 commences at block 202 with the performance of a lookup in a multicast forwarding table 214, utilizing the destination address 90 (otherwise known as the Destination Local Identifier (DLID)) of an incoming multicast transfer request, responsive to receipt of that incoming multicast request. The lookup is performed to identify one or more output port numbers to which a packet associated with the incoming multicast transfer request should be transferred from the input communications port 24.

At block 204, responsive to the lookup in the multicast forwarding table 214, a multicast vector 218 is outputted.

Figure 9:
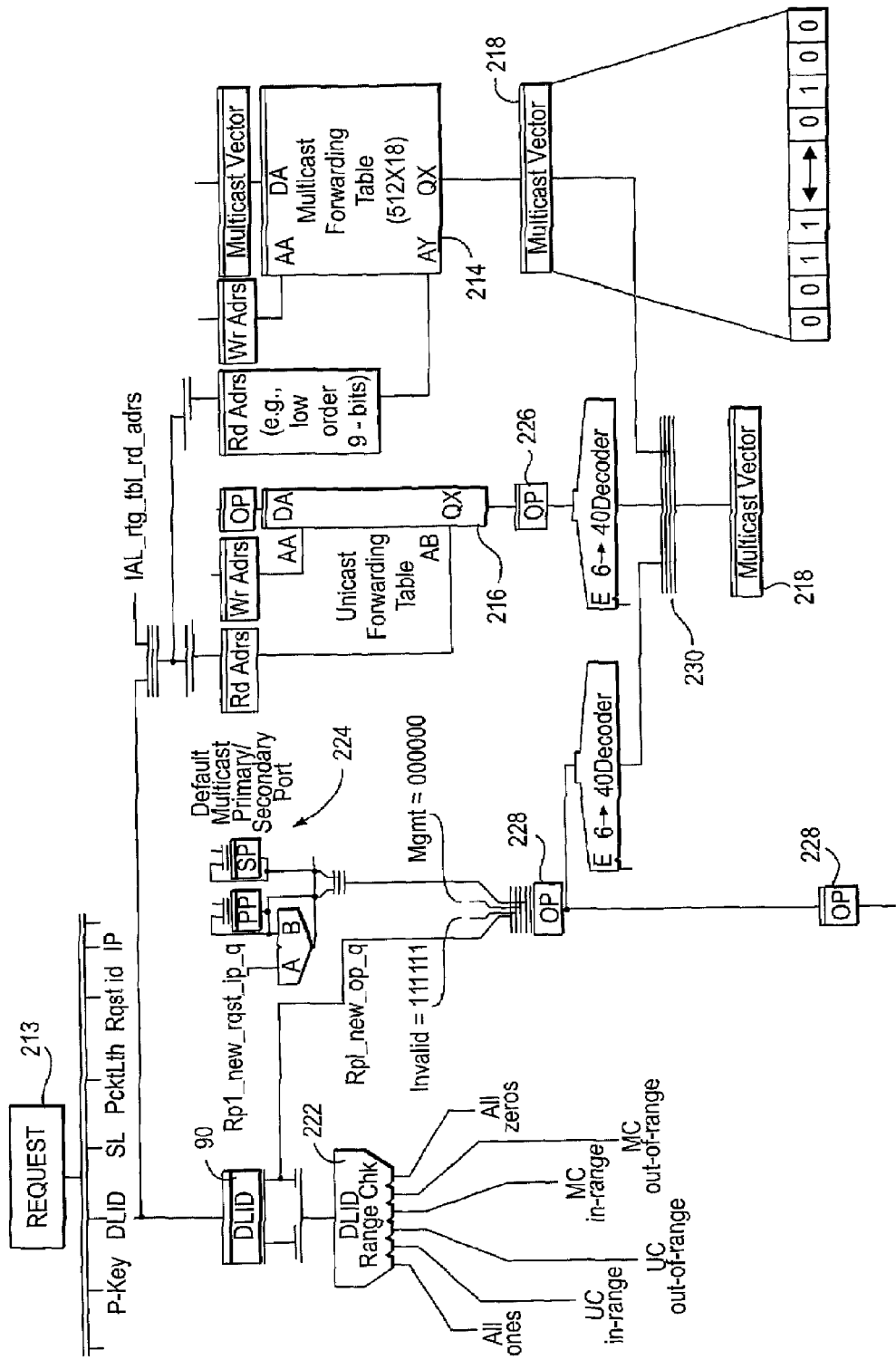
FIG. 9 is a pipeline diagram, according to an exemplary embodiment of the present invention, providing further details regarding the performing of a lookup in a multicast forwarding table utilizing the destination address of an incoming multicast request, and the output of a multicast vector.

FIG. 9 is a pipeline diagram providing further details regarding the operations performed at blocks 202 and 204 of FIG. 8, according to an exemplary embodiment of the present invention. Specifically, at a first pipe stage, an incoming multicast transfer request 213 is latched, the incoming transfer request 213 including the destination address 90 (or DLID). In one embodiment, low order 14-bits of the destination address 90 are utilized to index a unicast forwarding table 216, and low-order 9-bits of the destination address 90 are utilized to index the multicast forwarding table 214.

As indicated at 222, a range check is done against the destination address 90, and the results are subsequently encoded. The Table 1 shows exemplary range checks done against the destination address 90:

Range Checks

| Range | Use | Dest Code |
|---|---|---|
| FFFF | Permissive DLID - Management Unit | 1 1 1 |
| FFFE - C200 | Multicast out-of-range (use default multicast port) | 1 1 0 |
| C1FF - C000 | Multicast Forwarding Table | 1 0 1 |
| BFFF - 4000 | Unicast out-of-range (error) | 0 1 0 |
| 3FFF - 0001 | Unicast Forwarding Table | 0 0 1 |
| 0000 | Reserved | 0 0 0 |

As indicated at 224, certain transfer requests 213 may require the use of a default multicast port, in which case a selection is performed at 224 as illustrated in FIG. 9. Specifically, a secondary port is chosen if the input port identifier 82 of the request 213 equals the default multicast primary port. Otherwise, the primary port is chosen. A default multicast port is used when either (1) the multicast destination address 90 is out of range (see Table 1) or (2) a multicast forwarding table entry for the destination address 90 is 0 (or invalid).

FIG. 9 illustrates that a hit on the unicast forwarding table 216 utilizing the destination address 90 causes the output of a single output port 226.

In certain cases, an output port 228 may be identified without utilizing forwarding tables 216 and 214. Specifically, for a credit update request 74 and direct routing request 72, the output port is specified within the request, as indicated at 88 in FIG. 4. For destination routing requests 70, a destination address 90 having a specific value (e.g., 16'hFFFF which is a permissive destination address) causes the destination routing request 70 to be directed to the management port 26.

As illustrated in FIG. 9, a hit on the multicast forwarding table 214 causes the output of the multicast vector 218 that, together with the output ports 226 and 228, provides input to a MUX 230 that operates to select between these inputs. For the purposes of illustrating the present invention, assume that the MUX 230 selects the multicast vector 218 as an output.

The multicast vector 218 is shown to comprise a number of bit entries corresponding to the number of communications ports 24 of a datapath 20. Within the multicast vector 218, set bits identify respective output communications ports 24 to which a packet associated with the multicast request 213 should be transferred from a relevant input communications port 24.

Returning to the flow chart illustrated in FIG. 8, at block 206, the request preprocessor 38 performs a count of valid bits within the multicast vector 218 to generate a bit count. At block 208, a total grant count 240 is set equal to the bit count.

At block 210, the request preprocessor 38, and specifically the multicast processor 122, operates to spawn multiple unicast packet transfer requests (e.g., packet transfer requests 130 illustrated in FIG. 6) as specified by set bits within the multicast vector 218. Further, each spawned unicast packet transfer request 130, as illustrated in FIG. 6, is shown to include the total grant count 136 as set at block 208. The multiple unicast transfer requests 130 are then communicated from the request preprocessor 38 to the resource allocator 40 for arbitration.

At block 212, the resource allocator 40, in an out-of-order (OOO) manner, issues transfer grants 180, for example such as the grant 180 illustrated in FIG. 7 to be relevant input communications port 24 responsive to each of the unicast packet transfer requests 130 received at block 210. As illustrated in FIG. 7, each transfer grant 180 again includes the total grant count 136.

Figure 10:
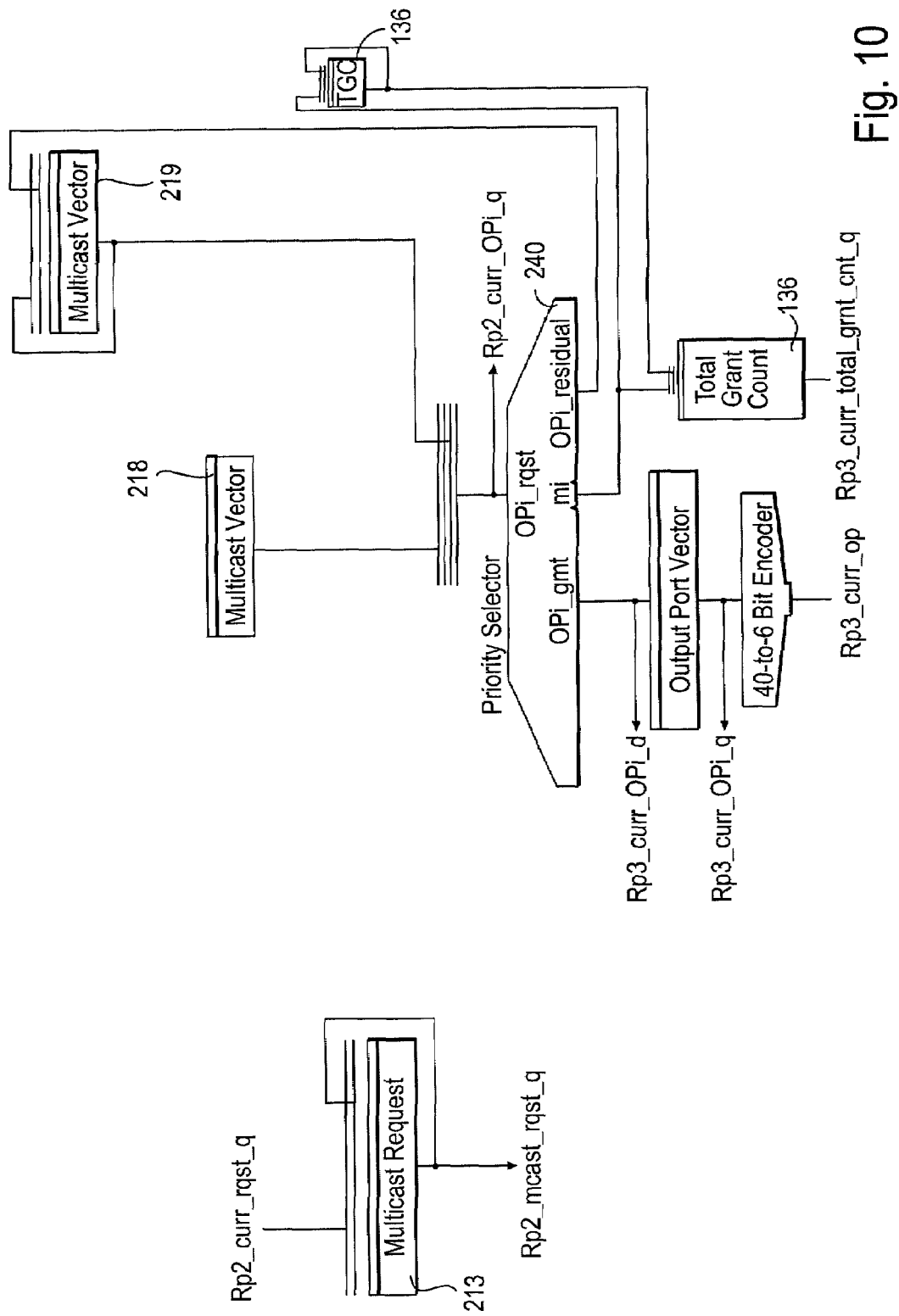
FIG. 10 is a pipeline diagram, according to an exemplary embodiment of the present invention, providing further details regarding maintaining of a total grant count, and the inclusion of such a total grant count within packet transfer requests issued to a resource allocator of an arbiter.

FIG. 10 is a pipeline diagram providing further details regarding operations performed at block 206–210 of FIG. 8. Specifically, at the commencement of a further pipestage, the multicast vector 218 is latched for a number of clock cycles in order to generate the multiple unicast transfer requests 130. The number of cycles for which the multicast vector 218 is latched is dependent upon the number of set bits within the multicast vector 218 (i.e., the fanout of the multicast vector 218).

As stated above, a multicast request 213 spawns a number of unicast transfer requests 130, as specified by bits of the multicast vector 218, which includes one bit per output per port including the management port 26 and the functional BIST port 28.

During a first spawning cycle, the multicast processor 122 tallies the number of output ports 24 to which the packet associated with the multicast request 213 will be transferred, based on the number of set bits within the multicast vector 218. This tally comprises the total grant count 136, which is saved at a register, as indicated in FIG. 10, for the duration of the multicast spawning process. As noted above, the total grant count 136 is included within each transfer grant 180. This enables an input communications port 24 to determine when the last grant 180 has issued, and the relevant packet can be discarded. Transfer grants 180 issued responsive to the spawned transfer requests 130 may not occur in the order in which the spawned transfer requests 130 were generated, and the actual grant order is affected by, inter alia, output communications port 24 availability.

During each multicast spawning cycle, the multicast processor 122 generates one unicast transfer request 130 for the output communications port 24 corresponding to a set bit in the multicast vector 218. As set bits within the multicast vector 218 are used, they are stripped from the multicast vector 218 to produce a residual multicast vector 219, as shown in FIG. 10.

Figure 11:
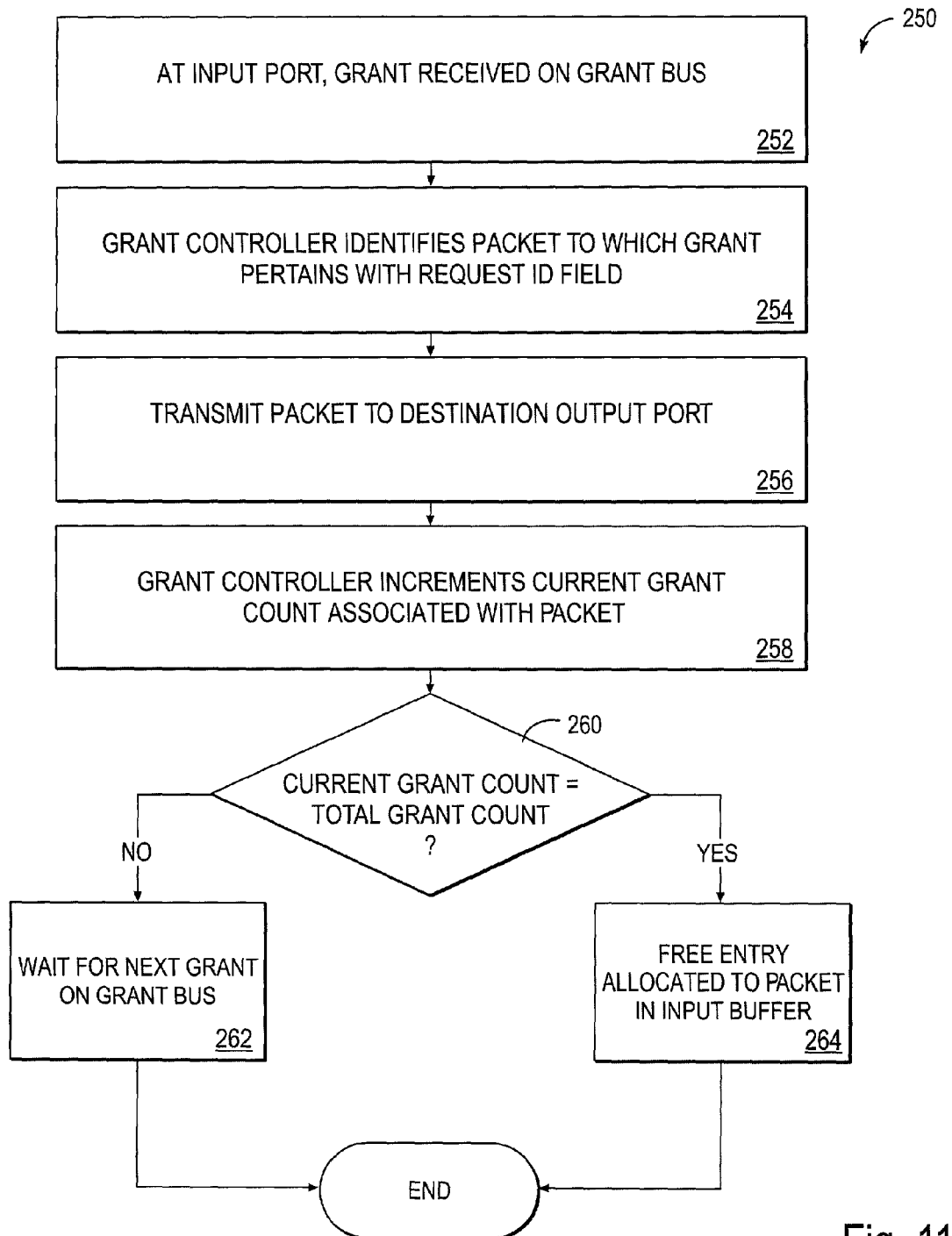
FIG. 11 is a flowchart illustrating a method, according to an exemplary embodiment of the present invention, of processing a transfer grant received at an input communications port of an interconnect device.

FIG. 11 is a flow chart illustrating a method 250, according to an exemplary embodiment of the present invention, of processing a transfer grant 180, received at an input communications port 24. The method 250 will be described with reference to the structure of an exemplary communications port 24 illustrated in FIG. 3, and with reference to the block diagram shown in FIG. 12.

At block 252, a transfer grant 180 is received at the input communications port 24 that issued the multicast transfer request. As described above, the destination routing request 70 spawned multiple transfer requests 130, responsive to which the arbiter 36 issued multiple transfer grants 180. The transfer grant 180 received at block 252 is one such transfer grant 180.

Referring to FIG. 3, the input communications port 24 includes an input buffer 58, in which the packet associated with the multicast transfer request is stored, and a grant controller 64. At block 254 of FIG. 11, the grant controller 64 identifies the packet to which the received transfer grant 180 pertains, utilizing the request identifier 142.

At block 256, the input communications port 24, responsive to the reception of the transfer grant 180 at block 252, proceeds to transmit the relevant packet to the output port 24, identified by the output port identifier 132 within the transfer grant 180, via the crossbar 22 of the datapath 20.

Figure 12:
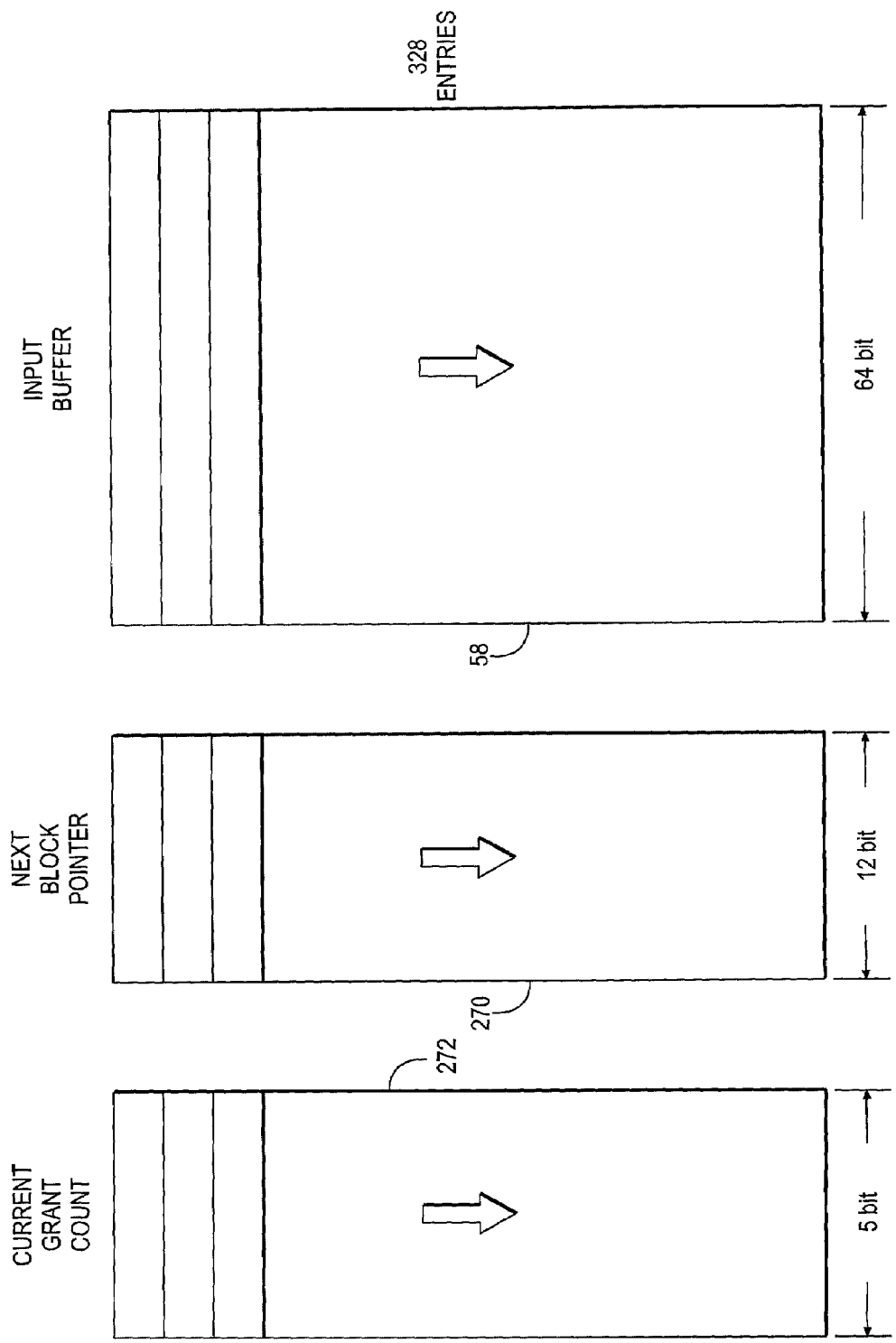
FIG. 12 is a block diagram illustrating further details regarding an input buffer, and associated data structures maintained in conjunction with an input buffer, within an input port of an interconnect device.

At block 258, the grant controller 64 increments a current grant count associated with the relevant packet as stored in the input buffer 58. FIG. 12 is a block diagram providing further details regarding the input buffer 58, and associated data structures maintained in conjunction therewith. Specifically, a next block pointer data structure 270 is shown to include entries corresponding to each entry within the input buffer 58, each entry of the data structure 270 storing a pointer to a subsequent entry within the input buffer 58 so as to enable entries within the input buffer 58 to be maintained as a linked list.

A current grant count data structure 272 similarly includes an entry corresponding to each entry of the input buffer 58, each entry within the current grant count structure 272 maintaining a current grant count value for a packet stored within a corresponding entry within the input buffer 58. At block 258, the grant controller 64 operates to increment the grant count value stored within the data structure 272 for the relevant packet.

At decision block 260, the grant controller 64 makes a determination as to whether the current grant count value for the relevant packet, as stored within the current grant count data structure 272, equals the total grant count 136, as included within the transfer grant 180. A positive determination at decision block 260 indicates that all transfer grants 180, generated responsive to the original multicast transfer request 213, have been responded to by the input communications port 24, and that it is accordingly no longer necessary to store the relevant packet within the input buffer 58 of the input communications port 24. Accordingly, at block 264, the entry of the input buffer 58 within which the packet is stored is freed.

On the other hand, following a negative determination at decision block 260, the input communications port 24, and specifically the grant controller 64, waits for a next transfer grant 180 to be received on the grant bus 34, without freeing the relevant entry in which the packet is stored in the input buffer 58.

In an alternative embodiment of the present invention, a current grant count is not maintained for each packet. In this alternative embodiment, the total grant count 136 is registered upon receipt of a first transfer grant 180 for a particular packet. Upon receipt of each subsequent transfer grant 180 relating to the particular packet, the registered total grant count 136 is then decremented at block 258. The determination made at decision block 260 is whether the registered total grant count 136 has reached a predetermined minimum value (e.g., a zero or one value). If so, this indicates that all transfer grants 180 pertaining to particular packet have been received, and the entry allocated to the relevant packet within the input buffer 58 is freed at block 264.

Note also that embodiments of the present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, the Verilog language or the SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, method and system to process a multicast request associated with a packet received and stored at an interconnect device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to process a multicast transfer request within an interconnect device, the method including:
   receiving the multicast transfer request pertaining to a packet stored by the interconnect device;
   spawning a number of unicast transfer requests based on the multicast transfer request, wherein the unicast transfer requests are specified by a set of bits within a multicast vector;
   generating a spawn count of the number of unicast transfer requests spawned based on the multicast request;
   responding to a generation of a transfer grant for at least one of the number of unicast transfer requests;
   determining whether transfer grants have been generated for all of the number of unicast transfer requests;
   discarding the packet to which the multicast transfer request pertains, if transfer grants have been generated for all of the number of unicast transfer requests; and
   retaining the packet to which the multicast transfer request pertains, if transfer grants have not been generated for all of the number of unicast transfer requests.

2. The method of claim 1 wherein the discarding of the packet includes freeing a memory location at which the packet is stored by the interconnect device, and wherein the retaining of the packet includes continuing storage at the memory location at which the packet is stored by the interconnect device.

3. The method of claim 1 including maintaining a transfer grant count of a number of transfer grants generated responsive to the number of unicast transfer requests, wherein the determination includes determining whether the transfer grant count equals the spawn count.

4. The method of claim 1 including generating a spawn count of the number of unicast transfer requests spawned based on the multicast transfer request, and decrementing the spawn count responsive to the generation of the transfer grant, wherein the determining includes determining whether the spawn count is equal to zero.

5. The method of claim 3 wherein the packet is received at an input port of the interconnect device and wherein the packet is stored at a memory location associated with the input port.

6. The method of claim 5 wherein the multicast transfer request is issued from the input port to an arbiter.

7. The method of claim 6 wherein the arbiter is a central arbiter associated with the interconnect device and is coupled to receive and arbitrate between transfer requests received from a plurality of input ports of the interconnect device.

8. The method of claim 6 wherein the spawning and the generation of the spawn count are performed by the arbiter, and wherein the spawn count is communicated to, and stored at, the memory location in association with the packet.

9. The method of claim 5 wherein the determination is performed by a grant controller associated with the input port.

10. The method of claim 3 wherein the generation of the spawn count includes identifying a number of output ports of the interconnect device to which the packet should be transmitted.

11. The method of claim 10 wherein the identifying of the number of output ports includes performing a lookup on a multicast forwarding table utilizing a destination address of the multicast transfer request.

12. The method of claim 11 wherein the lookup is to retrieve a multicast vector comprising a sequence of bits, at least one of the sequence of bits being set to identify an output port of the interconnect device.

13. The method of claim 12 wherein the identifying of the number of output ports includes performing a count of a number of set bits within the multicast vector.

14. A system to process a multicast transfer request within an interconnect device, the system including:
 a multicast processor to spawn a number of unicast transfer requests based on the multicast transfer request, the multicast transfer request pertaining to a packet stored by the interconnect device, wherein the multicast processor is configured to generate a spawn count of the number of unicast transfer requests spawned based on the multicast transfer request;
 a grant control coupled to receive transfer grants from an arbiter of the interconnect device and, responsive to receipt of a transfer grant for at least one of the number of unicast transfer requests, to determine whether transfer grants have been generated for all of the number of unicast transfer requests;
 wherein the grant control, if transfer grants have been generated for all the number of unicast transfer requests, is to discard the packet to which the multicast transfer request pertains and, if transfer grants have not been generated for all of the number of unicast transfer requests, is to retain the packet to which the multicast transfer request pertains.

15. The system of claim 14 wherein the grant control is configured to discard the packet by freeing a memory location at which the packet is stored by the interconnect device, and to retain the packet by continuing storage at the memory location at which the packet is stored by the interconnect device.

16. The system of claim 14 wherein the grant control is configured to maintain a transfer grant count of a number of transfer grants generated and receipt by the grant control responsive to the number of unicast transfer requests, wherein the grant control is configured to determine whether the transfer grant count equals the spawn count.

17. The system of claim 14 wherein the multicast processor is configured to generate a spawn count of the number of unicast transfer requests spawned based on the multicast transfer request, and the grant control is configured to decrement the spawn count responsive to the generation and receipt by the grant control of the transfer grant, wherein the grant control is configured to determine whether the spawn count is equal to zero.

18. The system of claim 16 wherein the packet is received at an input port of the interconnect device and wherein the packet is stored at a memory location associated with the input port.

19. The system of claim 18 wherein the multicast transfer request is issued from the input port to an arbiter, and wherein the arbiter includes the multicast processor.

20. The system of claim 19 wherein the arbiter is a central arbiter associated with the interconnect device and is coupled to receive and arbitrate between transfer requests received from a plurality of input ports of the interconnect device.

21. The system of claim 19 wherein the multicast processor is configured to communicate the spawn count for storage at the memory location in association with the packet.

22. The system of claim 16 wherein the multicast processor, during generation of the spawn count, is configured to identify a number of output ports of the interconnect device to which the packet should be transmitted.

23. The system of claim 22 wherein the multicast processor used to perform a lookup on a multicast forwarding table utilizing a destination address of the multicast transfer request to identify the number of output ports of interconnect device to which the packet should be transmitted.

24. The system of claim 23 wherein the multicast processor is configured to perform the lookup to retrieve a multicast vector comprising a sequence of bits, at least one of the sequence of bits being set to identify an output port of the interconnect device.

25. The system of claim 24 wherein the multicast processor is configured to identify the number of output ports by performing a count of a number of set bits within the multicast vector.

26. A machine-readable medium storing a description of a circuit, said circuit comprising:
 a multicast processor to spawn a number of unicast transfer requests based on the multicast transfer request, the multicast transfer request pertaining to a packet stored by the interconnect device; wherein the multicast processor is configured to generate a spawn count of a number of unicast transfer requests spawned based on the multicast transfer request;
 a grant control coupled to receive transfer grants form an arbiter of the interconnect device and, responsive to receipt of a transfer grant for at least one of the number of unicast transfer requests, to determine whether transfer grants have been generated for all of the number of unicast transfer requests;

wherein the grant control, if transfer grants have been generated for all of the number of unicast transfer requests, is to discard the packet to which the multicast transfer request pertains and, if transfer grants have not been generated for all of the number of unicast transfer requests, is to retain the packet to which the multicast transfer request pertains.

27. The machine-readable medium of claim 26 wherein the description comprises a behavioral level description of the circuit.

28. The machine-readable medium of claim 27 wherein the behavioral level description is compatible with a VHDL format.

29. The machine-readable medium of claim 26 wherein the behavioral level description is compatible with a Verilog format.

30. The machine-readable medium of claim 26 wherein the description comprises a register transfer level netlist.

31. The machine-readable medium of claim 26 wherein the description comprises a transistor level netlist.

* * * * *